March 3, 1970   A. GUDISH ETAL   3,498,100
PROCESS FOR MANUFACTURING RETAINER RINGS
Filed Feb. 13, 1968
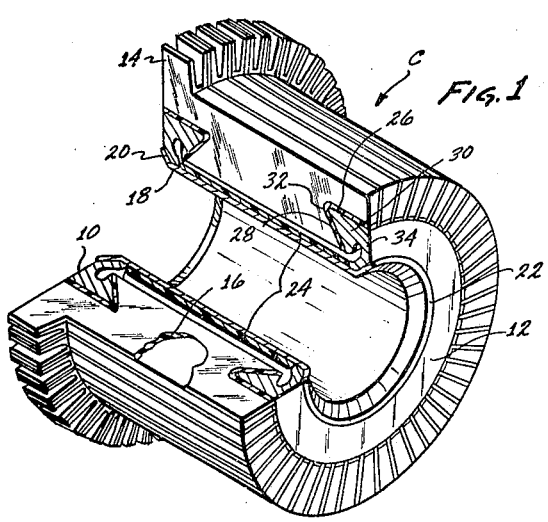
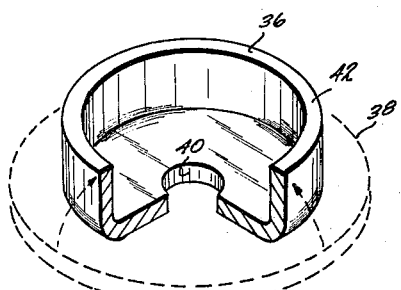
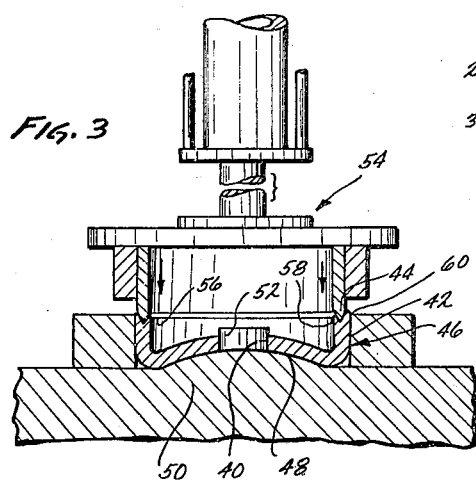
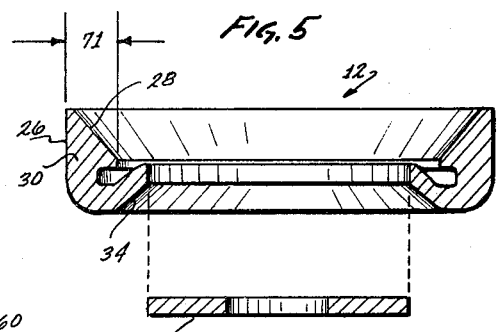
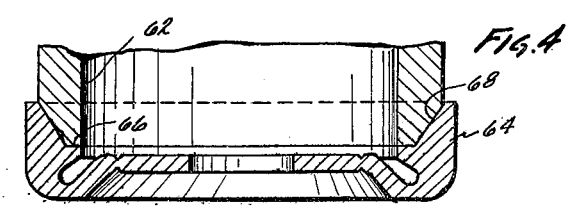
INVENTORS
ARTHUR GUDISH
MORTON ROVNER
BY Nilsson + Robbins
ATTORNEYS

United States Patent Office 3,498,100
Patented Mar. 3, 1970

3,498,100
PROCESS FOR MANUFACTURING
RETAINER RINGS
Arthur Gudish, 7607 W. Norton, Apt. 1 90046, and
Morton Rovner, 845 S. Manhattan Place 90005, both
of Los Angeles, Calif.
Filed Feb. 13, 1968, Ser. No. 705,188
Int. Cl. B21d 53/00
U.S. Cl. 72—335     8 Claims

ABSTRACT OF THE DISCLOSURE

A process is disclosed for forming a retaining ring (as for use in an electrical commutator) from a sheet metal workpiece, which ring has a substantially-increased thickness (in radial section) over the thickness of the sheet metal blank from which it is formed. In the illustratively-disclosed process, a workpiece of heavy sheet metal or plate is first formed into a cup with an axially-indented and apertured bottom. Next, while supporting the cup externally and through the aperture therein, an annular indentation is formed in the upper edge to develop a pair of concentric ridges or rises, one of which is then employed as a shoulder for subsequent die-forming operations to develop a desired radial dimension in the ring. Subsequent to the die-forming operations, during which the workpiece is externally supported and locked through the bottom aperture, the central portion of the bottom is removed to accomplish the desired retaining ring.

Background and summary of the invention

Metal-working machines and techniques represent a highly-developed art that is capable of accommodating the use of mass-production methods to accomplish many different products. However, a situation sometimes arises in which it is desired to manufacture only a limited number of metal members with the result that expensive tooling is neither practical nor economical. However, the production run may far exceed the number of parts which can be individually machined economically. These situations invariably present a difficult production problem and any general solution thereto is particularly significant in the metal-working field.

More specifically, with regard to the present development, the situation described above frequently occurs in the manufacture of certain metal rings as the type employed to retain a plurality of segmental elements together as a unit. Of course, such rings can be manufactured by employing various relatively-expensive techniques. However, a production run of a relatively limited number of rings of a specific design may present a substantial economic problem. As a related consideration, it may be possible to form the ring from a sheet or plate workpiece; however, conventionally, the limited dimensional thicknesses that could be developed from such a workpiece imposed a very significant limitation. Of course, as the thickness of the initial workpiece is increased, it becomes increasingly difficult to form with the result that the solution to the problem creating a ring (of substantial dimension) without expensive machining operations or production setups, is not readily apparent.

In general, the process of the present invention involves a series of steps including one in which an annular forming shoulder is developed which subsequently may be die-formed to accomplish a significant increase in the radial thickness of an annular workpiece. In somewhat greater detail, the process involves preliminary steps to develop the workpiece into a cup shape, the bottom of which is open to receive a mating guide, and is somewhat upwardly indented. Next, an annular groove is formed in the upper rim of the cup to define a shoulder which may be subsequently impacted and die-formed to define a section of substantially-increased radial thickness. Significant to the die-forming operation, the exterior of the workpiece (in a cup configuration) is supported and centrally locked by the aperture therein matingly receiving a locking extension of a die.

Brief description of the drawings

In the drawing, which constitutes a part of this specification, an exemplary embodiment demonstrating various objectives and features hereof is set forth, specifically:

FIGURE 1 is a partly-sectioned perspective view of a mechanical apparatus incorporating structures formed in accordance with the present invention;

FIGURE 2 is a partly-sectioned perspective view illustrative of one step in a process in accordance with the present invention;

FIGURE 3 is a sectional view illustrative of another step in a process in accordance with the present invention;

FIGURE 4 is a sectional view of a workpiece partially completed in accordance with the process of the present invention; and FIGURE 5 is a sectional view similar to that of FIGURE 4 illustrating a substantially-completed product produced in accordance with the present invention.

Description of the illustrative process

As required, a detailed illustrative process of the invention is disclosed herein. However, it is to be understood that the illustrative process is merely exemplary of the invention which may be practiced in many different forms and with many variations that are radically different from the illustrative process. Therefore, specific detailed steps and structures disclosed herein are not to be interpreted as limiting, but merely as a basis for the claims defining the scope of the invention.

Referring initially to FIGURE 1, a pair of similar commutator locking or retaining rings 10 and 12 are shown, formed in accordance with the process of the present invention. Specifically, the rings 10 and 12 function in an electrical commutator structure C to support and position a plurality of individual commutator segments 14 which are held spaced-apart by insulating sheets 16 of mica or fiber. Of course, the application of the rings 10 and 12 may vary widely; however, in the exemplary structure illustratively disclosed in FIGURE 1, an internal cylinder 18 is received through the opposed rings 10 and 12 with the individual segments 14 and sheets 16 held therebetween. The ends of the cylinder 18 are formed to include flared sections 20 and 22 for engaging the rings 10 and 12 and thereby locking the structure integrally together. Thus, the rings 10 and 12, along with the cylinder 18 to define a spool or core on which the individual segments 14 are supported. In this regard, it is to be noted that the cylinder 18 is covered by a cylindrical wrapper 24 of insulating material (paper or fiber) so as to isolate each of the commutator segments 14 from the internal structure.

In the illustratively-disclosed embodiment hereof, the rings 10 and 12 have substantial cross-sectional area including an internal axial taper for lockingly engaging the commutator segments. Specifically, considering ring 12 in detail (both rings being similar) the external annular surface 26 is substantially cylindrical. However, the internal surface defines a tapered internal shoulder 28 affording a section 30 of substantial radial thickness or width. The tapered shoulder 28 matingly engages detents formed in the individual segments 14 with an insulating sheet 32 therebetween and thus holds the commutator together. Considering the ring 12 further, outward (axially) from the section 30 the ring is reduced in thickness along a curved or turned-back internal section 34, the exterior surface of which matingly receives the flared section 22 of the central cylinder 18.

Retaining rings for various structures, as exemplified by the rings 10 and 12, are conventionally formed by operations which conventionally include a machining step. That is, metal stock is formed by various machine processes to accomplish a ring of irregular section, having a substantial thickness or cross-sectional area. These rings, when formed by prior conventional techniques have been either rather expensive to manufacture individually or mass production facilities therefor have been quite expensive. As a result, designs for rotary structures have often been quite limited. That is, to form rings (of the type considered above) by conventional methods requires either a substantial production run or a rather high individual cost, while alternative ring structures lacked adequate cross-sectional dimensions to provide sufficient strength in many applications.

Considering the manufacture of the rings 10 and 12, reference will now be made to the other figures in the drawings which illustrate various steps in a production process. Specifically, FIGURE 2 illustrates the formation of an apertured cup 36 from a circular plate or disk 38 (shown in phantom) of sheet metal. Initially, a hole or bore 40 is defined in the workpiece which serves to receive a support guide. Next, the external annulus of the workpiece is turned (die formed) axially to form an axial rim 42 as indicated. At this stage, the thickness of the cup 36 (through any of its walls) is rather closely related to the thickness of the original blank or disk 38. However, in accordance with the process hereof, the thickness of the rim 42 will be substantially increased to develop the desired ring.

Next, in the development, an annular indentation is formed in the edge of the rim 42, whereby to afford a shoulder to be impact developed so as to accomplish the desired thickness. That is, in forming an indentation in the edge of the rim 42, two rises or ridges are developed, one of which becomes a portion of the structure while the other affords a surface for die-forming the desired shape.

Referring to FIGURE 3, the formation of an annular groove or indentation 44 in the edge of the rim 42 is illustrated. Considering this operation in greater detail, the workpiece 46 (developed from the cup 36) is formed to provide a concave bottom 48 which matingly engages a die 50 including a circular extension 52 that is lockingly received in the bore 40. Thus, the rim 42 of the workpiece 46 is held along its external and lower surfaces as shown in FIGURE 3. While so supported, a die-stamping machine 54 impacts an annular forming tool or edge 56 into the workpiece 46 to develop the indentation 44.

After this formative step, the edge of the rim 42 defines a pair of concentric rises or shoulders 58 and 60, which are concentric and annular. It has been found possible to develop a rise or shoulder 60 which tapers to a terminating surface less than 1/16 inch wide, and preserves that surface narrow. The external shoulder 60 remains a part of the structural form; however, the internal shoulder 58 is employed to provide an impact surface for the further development of the desired ring. In that regard, the machine 54 is altered to provide a tool or stamping member 62 (FIGURE 4) indicated to be in forming engagement with the workpiece 64, as developed. Although the workpiece 64 is shown unsupported in FIGURE 4, it is to be understood that in fact, it is important that the workpiece be supported during substantially the entire formative process. As a related consideration, it is also important that the number of individual die forming operations may vary significantly, depending upon the metal of the workpiece, and the nature of the ultimate structural part to be developed. For example, the steps illustrated in FIGURES 3 and 4 may be separated by several intermediate die-forming operations to develop intermediate forms in the workpiece.

After the formative step illustrated in FIGURE 4, the workpiece 64 is further formed (by die-forming operations) to drive the shoulder 66 into continuous alignment with the taper 68. The result of such die-forming operations is the ring illustrated in FIGURE 5 from which the bottom 70 is indicated to be removed. Thus, a ring, as exemplified by the rings 10 and 12 in FIGURE 1, is accomplished. In this regard, it is particularly important to note that the thickness of the ring is substantially greater than the original disk from which the ring was developed. More specifically, the area of the section 30 affords two dimensions, both of which are greater than the thickness of the original blank or disk. Thus, the distance 71 (radial thickness), which is the thickness of the developed axial rim, is substantial, affording an effective length for the shoulder 28 which may be variously employed as to lockingly engage the individual commutator segments 14 as described with regard to FIGURE 1.

Thus, a die-forming machine may be employed in cooperation with a number of die-forming tools, to accomplish a desired ring. Such tools can be provided relatively inexpensively and the die-forming operations may be accomplished without the exercise of substantial skill. Therefore, by utilizing the process hereof, various three-dimensional metal shapes may be accomplished with relative inexpensive tooling and equipment. Furthermore, considerable experience and experimentation with the process hereof has indicated that workpieces may be formed to exceedingly high standards. In this regard, the system hereof is capable of completing relatively high tolerance work both with regard to specified shapes and deviations therefrom.

Of course as indicated above, the system hereof may be readily adapted to provide any of a wide variety of different shapes and may be incorporated in a wide variety of different machines; therefore, the system as disclosed herein is to be deemed merely an exemplary process and the scope hereof shall not be restricted but rather shall be interpreted in accordance with the claims as set forth below.

What is claimed is:

1. A process for manufacturing a retention ring, as for an electrical commutator, from a section of sheet metal stock, comprising the steps of:
   forming said section of sheet metal into a cup defining a bottom with an axial annular rim;
   die-forming an annular indentation in said rim whereby to define a pair of concentric rises extending substantially above the bottom of said annular indentation;
   further die-forming said rim forcing one of said concentric rises defined therein toward said cup bottom whereby to develop a substantial thickness in said axial annular rim.

2. A process according to claim 1, wherein said further die-forming is concentrated on the internal rise of said pair of concentric rises whereby to define an increasing thickness in said rim progressively approaching said bottom.

3. A process according to claim 2 wherein the initial forming of said cup includes developing an indentation in the bottom thereof.

4. A process according to claim 2 wherein said step of die-forming an annular indentation includes supporting the external annular surface of said rim during forming.

5. A process according to claim 3 further including a step of cutting a substantial portion out of said bottom, after said further die-forming.

6. A process according to claim 1 further including a preliminary step of punching a port centrally in said cup bottom to engage a guide support.

7. A process according to claim 1 wherein said rim is thickened substantially in said operation of die-forming said annular indentation.

8. A process according to claim 1 whereby one of said concentric rises is terminated in an annular surface less than one sixteenth inch wide.

References Cited

UNITED STATES PATENTS 523,726    7/1894    Marcy _____ 72—356

1,269,220    6/1918    Sanders _____ 72—373

LOWELL A. LARSON, Primary Examiner

U.S. Cl. X.R.

72—347, 256, 373